(12) United States Patent  (10) Patent No.: US 8,157,225 B2
Kephart  (45) Date of Patent: Apr. 17, 2012

(54) MONOPOD FOR CAMERA

(76) Inventor: Richard Earl Kephart, Los Angeles, CA (US)

( * ) Notice: Subject to any disclaimer, the term of this patent is extended or adjusted under 35 U.S.C. 154(b) by 178 days.

(21) Appl. No.: 12/462,308

(22) Filed: Aug. 3, 2009

(65) Prior Publication Data

US 2011/0024596 A1  Feb. 3, 2011

(51) Int. Cl.
*F16M 11/04* (2006.01)

(52) U.S. Cl. ............... 248/187.1; 248/188.5; 248/178.1; 248/177.1

(58) Field of Classification Search ............... 248/188.5, 248/178.1, 125.8, 125.2, 162.1, 177.1, 187.1, 248/158
See application file for complete search history.

(56) References Cited

U.S. PATENT DOCUMENTS

| | | | | |
|---|---|---|---|---|
| 2,916,243 A * | 12/1959 | Johnston | .................. | 248/231.41 |
| 3,143,941 A * | 8/1964 | Mason et al. | .................. | 396/151 |
| 3,533,583 A * | 10/1970 | Azim | .......................... | 248/125.2 |
| 3,724,885 A * | 4/1973 | Becker | .......................... | 403/104 |
| 4,911,397 A * | 3/1990 | Waterhouse | .................. | 248/610 |
| 4,941,631 A * | 7/1990 | Misch et al. | .................. | 248/176.3 |
| 5,429,332 A * | 7/1995 | Ishikawa | .................... | 248/187.1 |
| 5,566,915 A | 10/1996 | Hansare | | |
| 5,641,147 A | 6/1997 | Pena | | |
| 5,903,995 A | 5/1999 | Brubach | | |
| 6,027,085 A * | 2/2000 | Ruther | ........................ | 248/187.1 |
| 6,144,308 A * | 11/2000 | Dunne | ......................... | 340/689 |
| 6,663,298 B2 | 12/2003 | Haney | | |
| 6,783,105 B2 * | 8/2004 | Oddsen, Jr. | ................. | 248/279.1 |
| 6,905,264 B2 * | 6/2005 | McKay | ......................... | 396/421 |
| 7,027,097 B2 | 4/2006 | Zadok | | |
| 7,065,914 B1 | 6/2006 | Wagner | | |
| 7,372,502 B2 | 5/2008 | Gonzalez | | |
| 7,628,361 B2 * | 12/2009 | Gan et al. | ...................... | 248/132 |
| 7,677,510 B2 * | 3/2010 | Tang | .......................... | 248/188.5 |
| 7,905,667 B2 * | 3/2011 | Barker | ......................... | 396/419 |
| 2002/0179785 A1 | 12/2002 | Hetrick et al. | | |
| 2005/0051683 A1 * | 3/2005 | Young | ........................ | 248/187.1 |
| 2007/0262210 A1 * | 11/2007 | Oh et al. | ..................... | 248/125.1 |
| 2008/0056808 A1 | 3/2008 | Bevirt | | |
| 2009/0095855 A1 * | 4/2009 | Su | ............................. | 248/177.1 |
| 2009/0114781 A1 * | 5/2009 | McAnulty | .................. | 248/187.1 |
| 2009/0129769 A1 * | 5/2009 | Broberg | ........................ | 396/428 |
| 2010/0102188 A1 * | 4/2010 | Liu | ............................ | 248/295.11 |

* cited by examiner

*Primary Examiner* — Nkeisha Smith
(74) *Attorney, Agent, or Firm* — Terrance Mason

(57) ABSTRACT

The invention relates to a monopod device for use with a camera, which uses one or more constant force helical springs to counterbalance the weight of a camera and lens, as well as a camera tilt mechanism, the combination of which effectively provides weight compensation that significantly reduces the lifting force required by a user to move the camera and provides stable image capture, camera control, and a reduced footprint when compared to existing tripods.

3 Claims, 4 Drawing Sheets

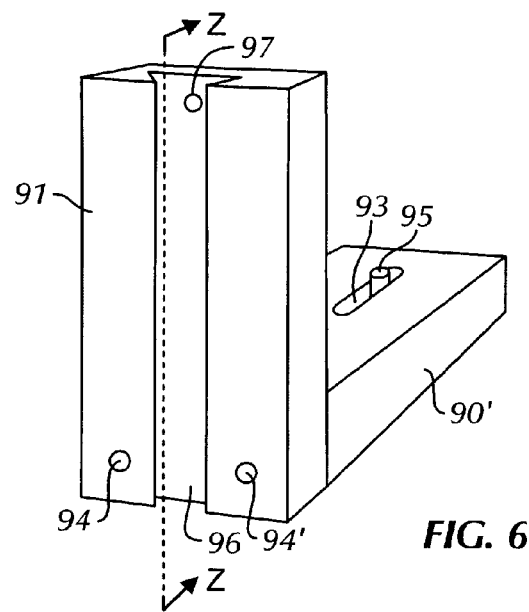
FIG. 6
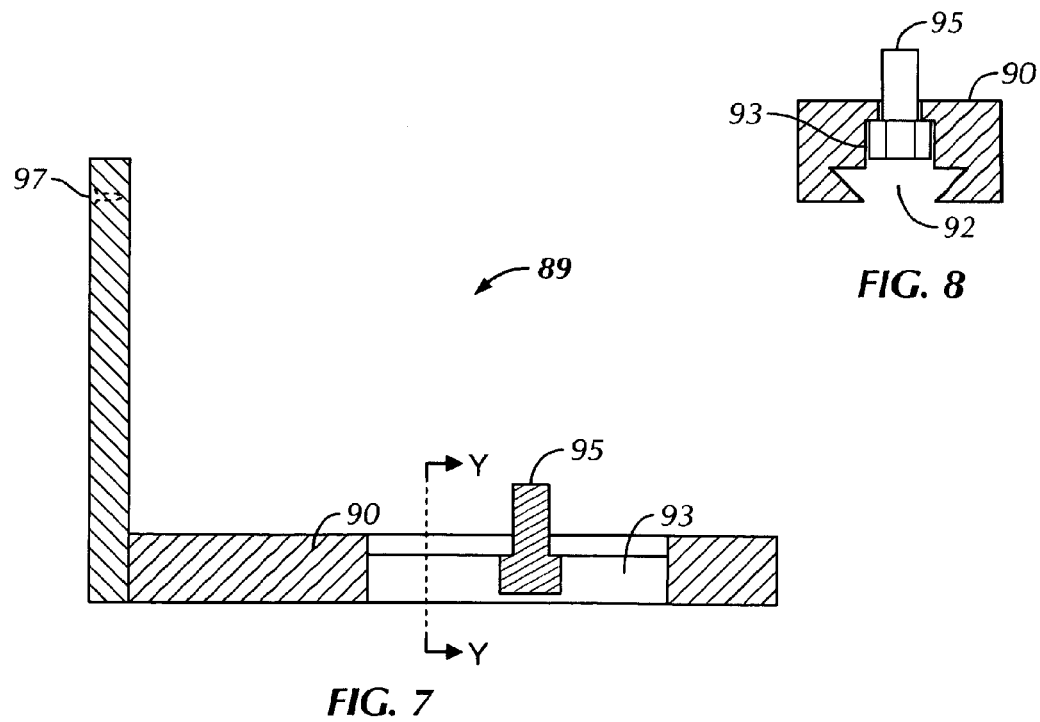
FIG. 8
FIG. 7

MONOPOD FOR CAMERA

FIELD OF THE INVENTION

This invention relates to an improved monopod mounting device especially useful for still or video camera and lens combinations but is also useful for firearms, spotting scopes and the like.

BACKGROUND OF THE INVENTION

Users of optical devices, such as cameras, spotting scopes, or high power binoculars have difficulty in holding their handheld steady enough from the offhand position to ensure adequate accuracy for long-range shots. Furthermore, it is often difficult to target and remain affixed steadily on an object even at short range for extended periods. After a few seconds of hold, the user's stability generally decreases to the point where adequate definition of the object being studied is lost. An attachment or stand to assist the users of these devices in achieving adequate steadiness would be very desirable.

Solutions that have been devised include harnesses and shoulder support systems to accommodate and compensate for user movement. These systems, though effective, are expensive, cumbersome, often require training and experience to operate effectively and are usually limited to use by professional cameramen. The most reasonable alternative are stands and these comprise tripods and monopods with each having their own intrinsic advantageous and limitations. Most monopods and tripods are made up of a plurality of elongated sections arranged in a telescopic manner to extend the length of the pod.

Tripods are advantageous from the stability point of view, but the need to adjust each leg of the tripod to ensure correct vertical height adjustment requires both physical exertion and focused attention. The effort and time needed to deploy the tripod can be better dedicated to the task of image composition and acquisition. Since increased stability requires a larger tripod footprint on which the legs can be spread out, it is not uncommon for its users to trip over or have camera accessories such as cables and cords get entangled with the extended legs of the tripod. Furthermore, they are generally relatively bulky and heavy to move/transport, as well as being complicated to set up, particularly on uneven surfaces or surfaces which are not horizontal. Monopods, on the other hand, weigh little and take up little space during transportation, they are quick to set up, easy to move with a camera attached while work is in progress, can be placed on substantially any surface and only require a small area.

However, these traditional tripods and monopods that are currently available in the market are of the telescoping leg kind comprising two or more hollow shafts that are slideably connected to each other and engaged by means of an interference fit or clamps which retain them together at the desired position of retraction or extension. Such telescoping means are commonplace and generally utilize an interference fit in order to achieve engagement. U.S. Pat. No. 7,222,827, entitled "Telescoping Leg Lock With Thumb Actuator" to Crain et al. describes one such clamping method, and U.S. Pat. No. 5,903,995 entitled "Monopod" to Brubach describes another clamping method for telescoping legs. In particular, the Brubach patent exhibits a monopod that can be raised or lowered to virtually any position in the vertical plane while still maintaining level sight alignment. This is accomplished by means of choke collars that are known in the art. However, the Brubach patent does not provide for a counter balancing system to permit a smooth, controlled raising and lowering of the camera and requires the need to release and relock extensible rods.

U.S. Patent Application No. 200201797895 entitled "Monopod Camera Stand" to Boyd et al. shows a series of rod connectors that limit the position of the camera to distinct fixed positions relative to the ground.

A further limitation associated with the effective use of traditional tripods and monopods utilizing hollow telescoping legs for still or video camera image capture are in situations and events where high mobility is required such as photojournalism, sporting events, concerts, ceremonies, where the need to extend/retract and further to continually de-clamp/re-clamp the hollow telescoping legs is limiting. This limitation therefore impedes the use of these traditional tripods and monopods in situations where rapid response is crucial to visually record an impromptu or short-lived event.

There is therefore a need in the marketplace for a robust, simple-to-use monopod support and stabilization system that offers controlled but rapid repeatable stability in a variety of environments, and which is affordable by the larger general consumer camera enthusiast, as well as the professional photographer, and which avoids or overcomes the limitations to the systems described above.

SUMMARY OF THE INVENTION

The present invention substantially departs from the prior art concepts and designs of known monopods. No existing monopod provides the benefits attributable to the present invention. Additionally, the prior art cited neither suggest nor teach the present inventive combination of component elements arranged and configured as disclosed and claimed herein.

As recited earlier, the present invention is useful for any handheld apparatus such as a still or video camera and lens combination, as well as for firearms, spotting scopes and other handheld equipment. For the sake of simplicity, this specification will refer to any such apparatus as a camera. In a preferred embodiment of the present invention, provided is an apparatus that is a monopod, which is a hollow shaft, within which a constant force helical spring counterbalance mechanism is contained and is the means by which camera weight compensation is achieved without complex adjustment, engagement or control means.

According to this embodiment of the present invention, vertical adjustment of the camera is achieved by integrating into the monopod a constant force helical spring, one end of which is connected to a stationary component affixed to the top of the monopod and the other end of said helical spring being attached to a movable plug that is movable within the hollowed portion of said monopod. In accordance with one embodiment of the invention, there is provided a camera mount bracket to connect it to the monopod to steady the camera.

Said movable plug is either formed as an integrated element with or may be mechanically or electromechanically attached to the camera mount bracket that is external to the monopod via one or more slots that is formed parallel to the longitudinal axis of the monopod shaft. Said camera mount bracket is designed to interface with, engage and retain a camera. Further, the constant force helical spring is selected to generate a counter-force to help counteract the combined weight of the movable plug, the external camera mount bracket, and the camera and lens.

With the apparatus according to the present invention, the weight of the movable camera may be exactly or partially counterbalanced so that the force that the photographer needs to exert to raise the camera is reduced. In some situations, a photographer may need to use large lenses that may be sometimes much heavier than even the camera it is connected to. In this event, by appropriate selection of constant force helical spring, even large, cumbersome camera-lens combinations may be lifted. This reduces manual exertion and allows greater mobility and control of the camera.

In another embodiment of the present invention, the apparatus or monopod may comprise a plurality of constant force helical springs optimized to accommodate for a large range of camera and lens weights, said constant force helical springs being connected to and disposed between the moveable plug and a stationary component as previously described.

Additionally, the monopod of the present invention may either be designed so that its bottom end is releasably attached to a traditional tripod described earlier where conditions permit, or may be a stand-alone apparatus when conditions for traditional tripods become unfriendly. Alternatively, the monopod bottom end can be designed so that it may be accessorized with any selection of low profile studio and outdoor bases currently available via a variety of snap-on specialty mounts. The entire system can be converted into a portable camera and lighting package to establish a controlled photographic stage for repetitive documentation purposes.

A key feature of the present invention is the use of constant force helical springs as the counter balance force and means for stable control of the height of the camera mounted on the camera mount bracket. Constant force springs are a type of extension spring that generally consists of a spiral material with built-in curvature so that each turn of the strip wraps tightly on its inner neighbor. However, unlike standard compression springs, when the strip of the constant force spring is extended, the inherent stress resists the loading force just as in a common extension spring but at a nearly constant zero rate.

In the present invention, since the relationship between input deflection and the output force is fixed for constant force springs, the user has the advantage that the control effort to raise or lower the camera is minimized.

Springs and other elastic materials generally follow the approximation described by Hooke's law of elasticity, wherein the extension of a spring is in direct proportion with the load added to it as long as this load does not exceed the elastic limit. Materials for which Hooke's law is a useful approximation are known as linear-elastic or "Hookean" materials. However, constant force springs deviate from Hooke's law and the force it exerts over its range of motion is a constant.

A primary objective of the present invention is to provide for a monopod apparatus with advantages that are not provided or taught by prior art.

Another objective of the present invention is to provide for a non-pneumatic support apparatus capable of supporting a camera over a useful, flexible range of heights without the use mechanical clamps or chokes to retain the camera in place.

Another objective of the present invention is to provide for a camera support apparatus that is versatile and responsive to the needs of users to enable them to capture rapidly changing events.

BRIEF DESCRIPTION OF THE DRAWINGS

FIG. 6 is a rear perspective view of the camera mount bracket.

FIG. 7 is a cross-sectional, elevational view of the camera mount bracket of the present invention taken along the line Z-Z.

FIG. 8 is an end view of the camera mount bracket only in FIG. 6 taken along the line Y-Y.

DESCRIPTION OF THE PREFERRED EMBODIMENT

The present invention will now be described more fully hereinafter with reference to the accompanying drawings, in which a preferred embodiment of the invention is shown. This invention may, however, be embodied in many different forms and should not be construed as limited to the embodiments set forth herein; rather, this embodiment is provided so that this disclosure will be thorough and complete and will fully convey the scope of the invention to those skilled in the art.

Figure 1:
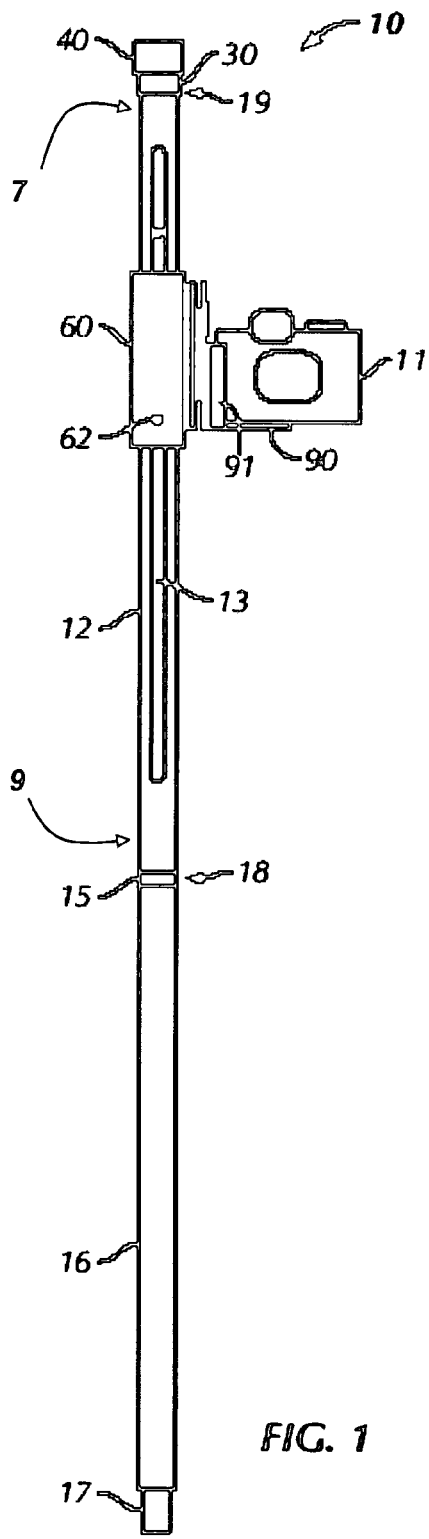
FIG. 1 is a rear elevational view of the present invention with a camera shown in operative position ready to take a picture.
Figure 2:
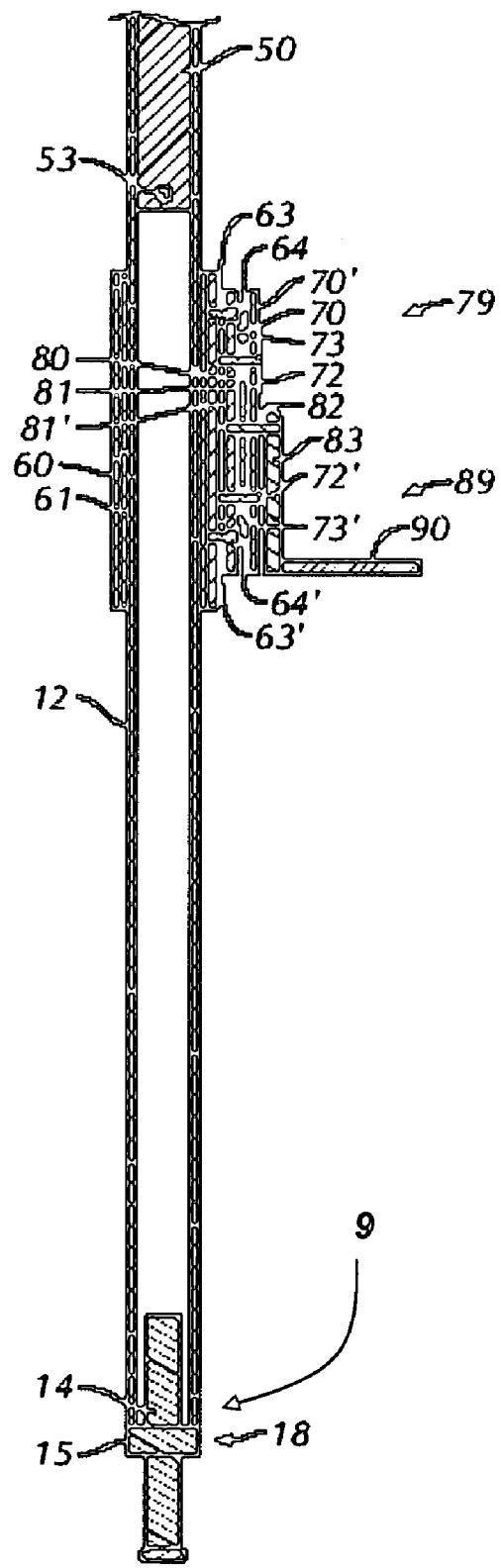
FIG. 2 is an enlarged, cross-sectional, elevational view of a portion of the hollow shaft of FIG. 1.

Referring now to the drawings, there is shown in FIGS. 1 and 2, an embodiment of the present invention, which is a monopod, generally designated 10 that is lightweight and portable. It provides support to the camera 11 and enhances user control throughout the slotted length of its permitted travel along the hollow shaft 12, and the up and down tilting of the camera. The slotted length is defined by a hollow shaft slot 13 that runs along a part of the length of the hollow shaft 12. The hollow shaft 12 has an upper end 7 and lower end 9, and comprises the primary mechanism of the embodiment of the present invention and is able to stand alone or on an assortment of bases such as a foot plug 14. Also shown is a support leg 16 that is joined to the hollow shaft 12 in order to extend the gross working vertical length of the monopod 10, as well as a camera mount and tilt mechanism 79, which facilitates the retention and control of a camera.

The hollow shaft 12 incorporates the primary mechanism of the monopod 10, and has a hollow shaft head 19 to which capsules 30, 30' are attached and a hollow shaft foot 18 that enables the monopod to either stand alone or on an assortment of bases. The hollow shaft 12 is connected at its hollow shaft foot 18 to a support leg 16 by means of a connector plug 14 to thereby extend the gross working vertical height of the monopod 10. The connector plug 14 is generally cylindrical and formed so that its end forms an interference fit with the internal surface of the hollow shaft 12 and support leg 16, and is over sized in the middle to form a connector plug spacer 15 to prevent damage to the hollow shaft and support leg. The support leg 16 may be any one of a variety of tubes, stands, and tripods; alternatively, if an extension is desired, the foot plug 17 at the base of the support leg 16 can be replaced by a variety of tubes, stands, and tripods to broaden the versatility of the present invention across an increased range of photographic opportunities and environments. Alternatively, the foot plug can also be supplied with a spiked end to enable placement of the monopod on the ground.

Figure 3:
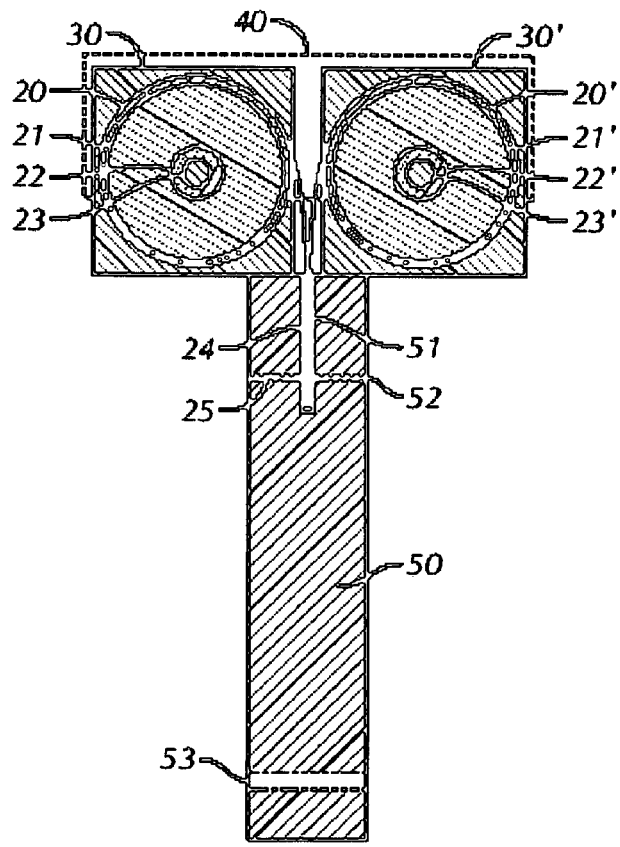
FIG. 3 is an exploded, side elevational view of the helical spring and movable plug assembly of the present invention in FIG. 1.

Referring also now to FIG. 3, shown is an enlarged view of the constant force spring mechanism which comprises constant force helical springs 20, 20' that are connected to a movable plug 50 by pin 25 that fits into helical spring retaining hole 52. More specifically, the constant force helical springs 20, 20' sit at the top of the hollow shaft 12. The movable plug 50 travels inside the cavity of the hollow shaft 12 as a result of its attachment to collar 60 which the user photographer causes to move. Movable plug 50 is attached to the collar 60 and collar sleeve 61 via collar pin 62, which fits into plug retaining hole 53 through slot 13. Since collar 60 travels along the outside of the hollow shaft 12 in tandem with the movable plug 50, it therefore contributes to maintaining the mechanical integrity of the hollow shaft 12 by preventing its walls from buckling inward or outward. The collar 60 also supports a camera mount plate 80 upon which camera mount bracket 89 rests and provides for an up/down camera tilt feature. Collar sleeve 61 interfaces between the collar 60 and hollow shaft 12 and is selected from materials that ensure that it is slideably connected to the hollow shaft 12 and is intended to minimize friction as it slides along the length of the hollow shaft 12.

Constant force helical springs 20, 20' act as counterweight force means and are selected to counteract the loading force of the movable plug 50 and the other elements attached to the movable plug 50, as well as in accordance with the specific desire of the photographer user. Constant force helical spring 20, 20' are mounted with internal diameters tightly wrapped around drums 21, 21' that ride on bearings 22, 22' which are in turn held in place by axles 23, 23' that are further retained by capsules 30, 30'. Constant force helical springs 20, 20' will have the tendency to force the top of the capsules 30, 30' away from each other. In order to hold capsules 30, 30' in the positions shown in FIG. 3, container box 40 is used to counteract the forces. Those skilled in the art will realize that there are numerous means to hold or mechanically bond capsules 30, 30' together. The free ends of the constant force springs attached to the loading force, which is the movable plug 50, etc. The movable plug 50 also has a slot 51 to receive the constant force helical spring ends 24 and a hole 52 through which the spring ends 24 are secured by a pin 25. In other embodiments, the load capacity can be increased by using a plurality of constant force springs mounted in tandem on top of each other.

Figure 4:
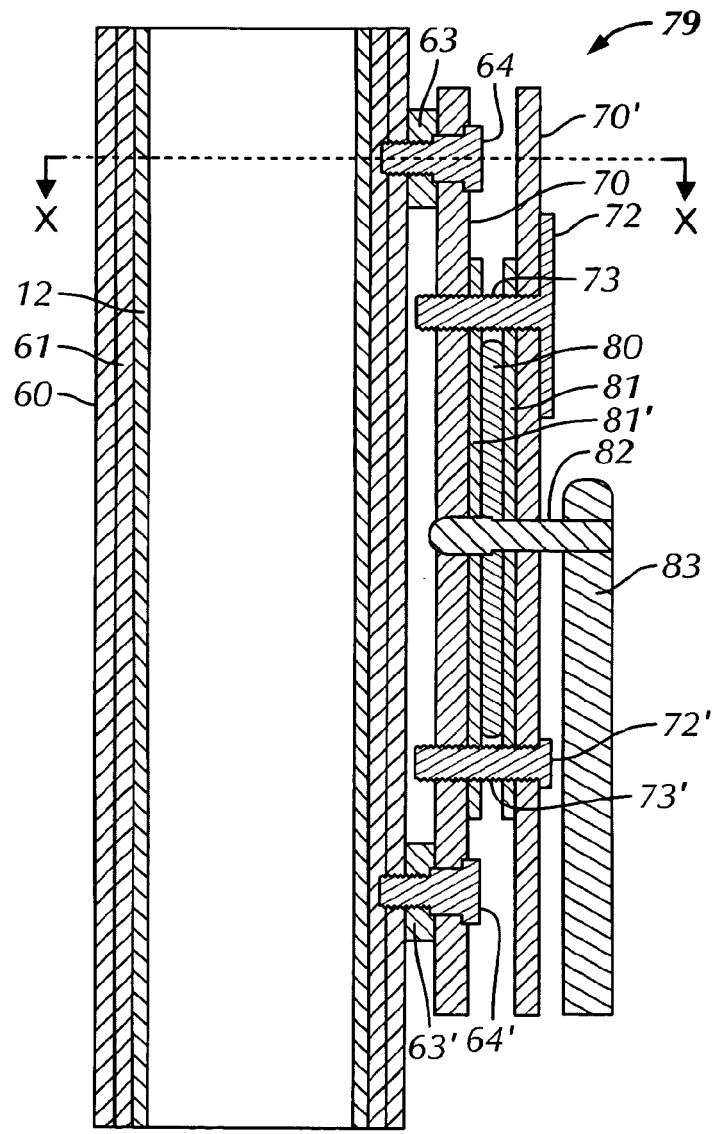
FIG. 4 is an enlarged, cross-sectional, elevational view of the camera mount and tilt mechanism of the present invention in FIG. 1.
Figure 5:
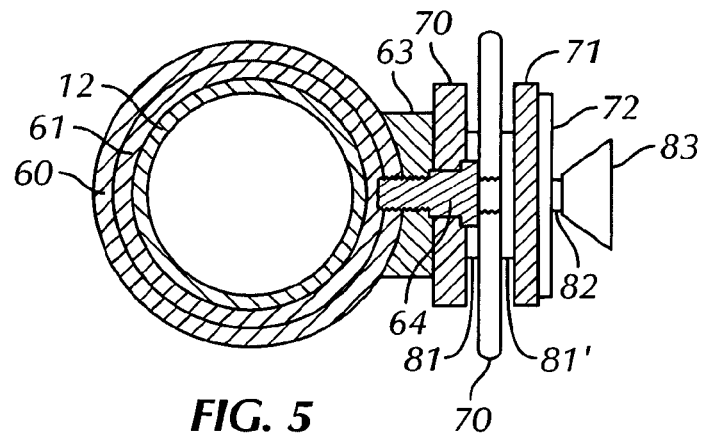
FIG. 5 is a top view of the present invention in FIG. 4 taken along the line X-X.

Turning now to FIGS. 4 and 5, in addition to height adjustment, the present invention includes means to mount and control the camera's vertical attitude (up and down tilt) by a camera and tilt mechanism 79 that is mounted onto the collar 60. Tapped holes in collar 60 receive coves 63, 63' that convert one side of collar 60 into a flat plane. Spacer screws 64, 64' retain coves 63, 63' and the rear pressure plate 70 against the hollow shaft 12.

The camera mount and tilt mechanism 79 includes a rear pressure plate 70 and front pressure plate 70' and corresponding friction pads 81, 81', which are used to sandwich a rotating camera mount plate 80. A camera mount spindle 82 extends from the rotating mount plate 80 through to the front pressure plate 70' and is mechanically attached to the camera mount tongue 83 using splines, screws, welding, chemical bonding or similar means. An element of the camera mount and tilt mechanism 79 is that the center of gravity of the camera is generally near the centerline of spindle 82. Tightening pressure plate adjustment screw 72, 72' forces friction pads 81, 81' against rotating camera mount plate 80 thereby restricting its rotational movement. This permits the user to control the up and down tilt of the camera 11 from its free tilt position and further so that when the photographer is satisfied with the tilt angle and aim he can release the camera without changing the pre-adjusted camera tilt angle. The pressure can be adjusted according to the camera's size and weight. Furthermore, the moment produced by the weight of the camera 11 causes the collar 60 to tighten against the hollow shaft 12 and this enables both the collar 60 and the moveable plug 50 to which it is connected to hold fast against the monopod.

Turning now to FIGS. 6, 7 and 8, there is shown a camera mount bracket 89 and elements thereof. The camera mount bracket 89 comprises of a vertical mount bracket arm 90 and horizontal mount bracket arm 91 and are held together by bracket reinforcement screws 94, 94' and is further configured to mate with and be attached to the base of the camera 11 by means of mounting bolt 95, whose travel is limited to the length of the slot 93, which is sized in order to adjust to a variety of cameras. In the usual upright, vertical position, the female dovetail groove 96 of the camera mount bracket 89 slides over the mating male dovetail camera mount tongue 83 of FIG. 5. For the horizontal position, longitudinally formed dovetail groove 92 is also formed to slide over mating male dovetail camera mount tongue 83 in a similar manner.

I claim:

1. A counter balancing monopod comprising:
   a hollow shaft having an upper end and a lower end, further wherein the shaft has a slot along its longitudinal axis;
   a camera mount;
   a moveable plug that is slideable within said hollow shaft; means for securing the camera mount to the moveable plug; and
   a constant force spring mechanism with a proximal end thereof attached to the movable plug and a distal end thereof attached to the upper end of said hollow shaft such that a constant force is exerted by the constant force spring mechanism upon the moveable plug as it travels within said hollow shaft;
   wherein said camera mount comprises:
   a collar that is disposed circumferentially around and slideably connected to said hollow shaft and mechanically attached to said movable plug through said slot;
   a camera mount bracket; a spindle extending from said collar perpendicular to said hollow shaft;
   mechanical attachment means to attach said spindle to said camera mount bracket; means for removably securing a camera to said camera mount bracket; tilt control means to provide for tilting of the camera about an axis of said spindle.

2. The claim as in claim 1, wherein tilt control means comprises:
   a pair of opposing pressure plates and a pair of friction pads mounted on either side of a rotating mount plate that is mechanically fastened to said spindle;
   and means to adjust a force on said opposing pressure plates.

3. A counter balancing monopod comprising:
   a hollow shaft wherein the shaft has a slot along its axis;
   a camera mount;
   a moveable plug that is slideable within said hollow shaft;
   means for securing the camera mount to the moveable plug through said slot; and
   a plurality of helical constant force springs attached at one of their ends to said movable plug and attached to a rotating mechanism at their other ends at a top end of said hollow shaft, further wherein said rotating mechanism comprises a pair of drums further comprising a cylinder supported upon bearings, and further wherein each drum is housed within a capsule;
   wherein the rotating mechanism further comprises the at least one pair of drums disposed against each other and each capsule housing each drum of said pair of drums being such that the capsules are held against each other in a container so that when the plurality of helical constant force springs are extended, said container serves to resist a force of said plurality of helical springs to rotate said capsules away from each other.

* * * * *